May 10, 1966 C. W. BUNTING 3,250,162
METHOD AND APPARATUS FOR TRIMMING BOOKS
Filed Aug. 14, 1963 5 Sheets-Sheet 4
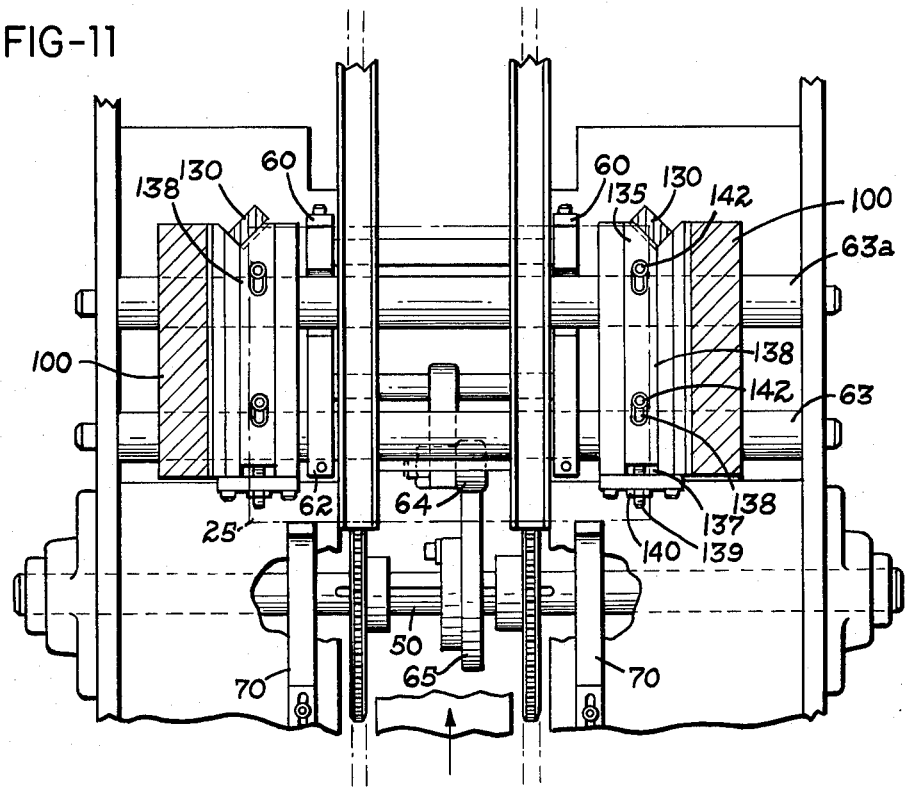
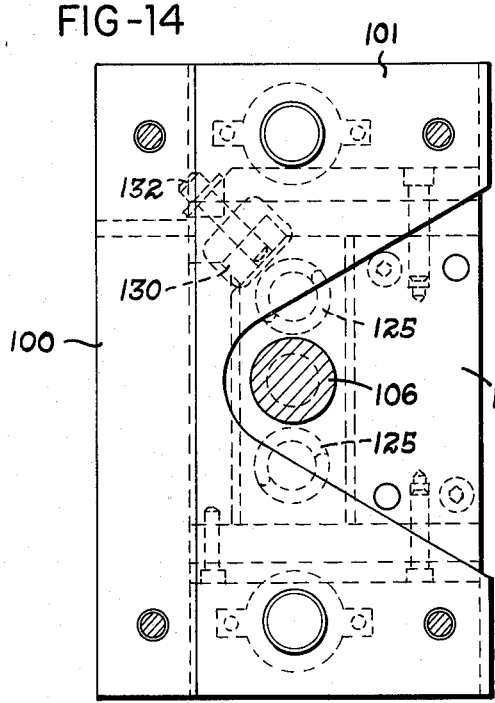
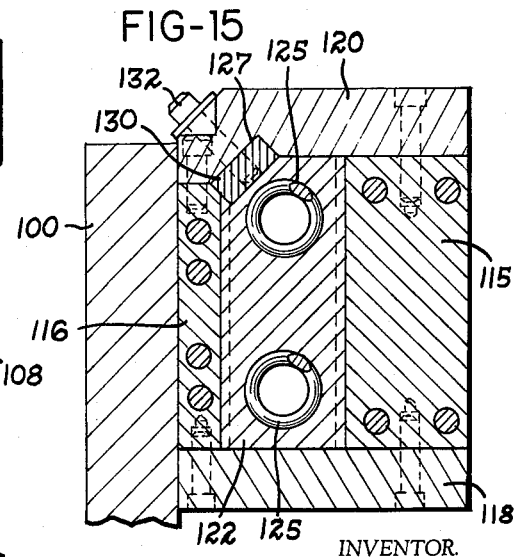
INVENTOR.
CHARLES W. BUNTING
BY
Marechal, Biebel, French & Bugg
ATTORNEYS May 10, 1966  C. W. BUNTING  3,250,162
METHOD AND APPARATUS FOR TRIMMING BOOKS
Filed Aug. 14, 1963  5 Sheets-Sheet 5
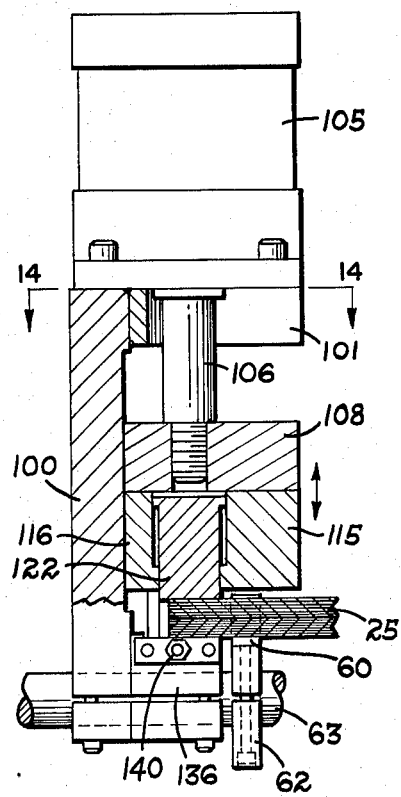
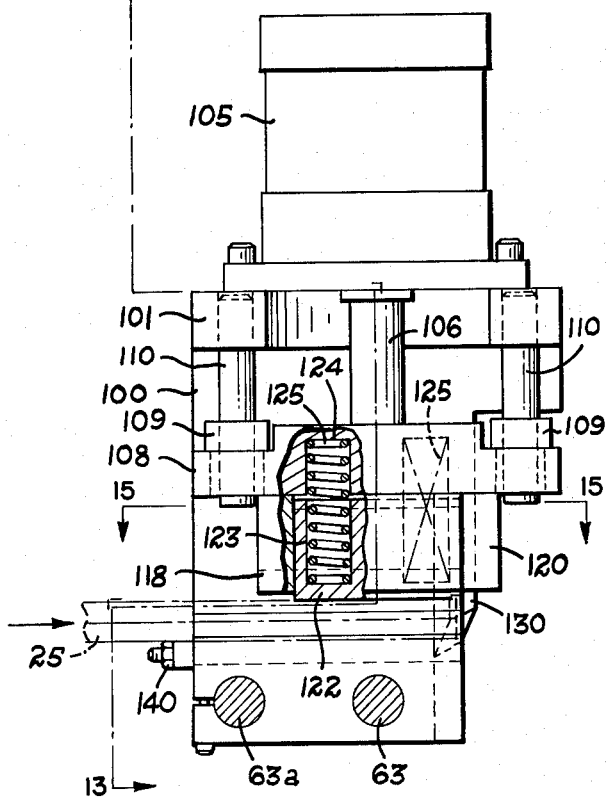
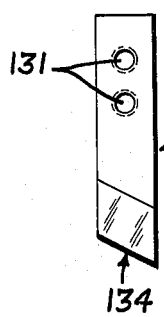
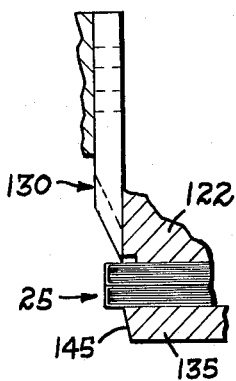
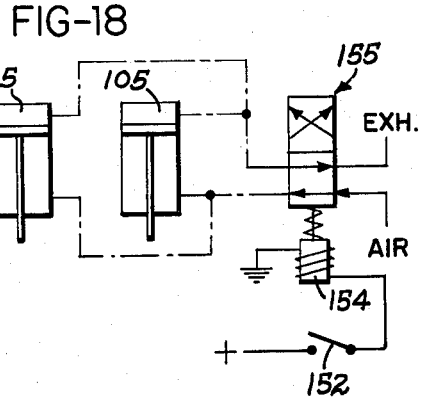
INVENTOR.
CHARLES W. BUNTING
BY
Marchal, Biebel, French & Bugg
ATTORNEYS

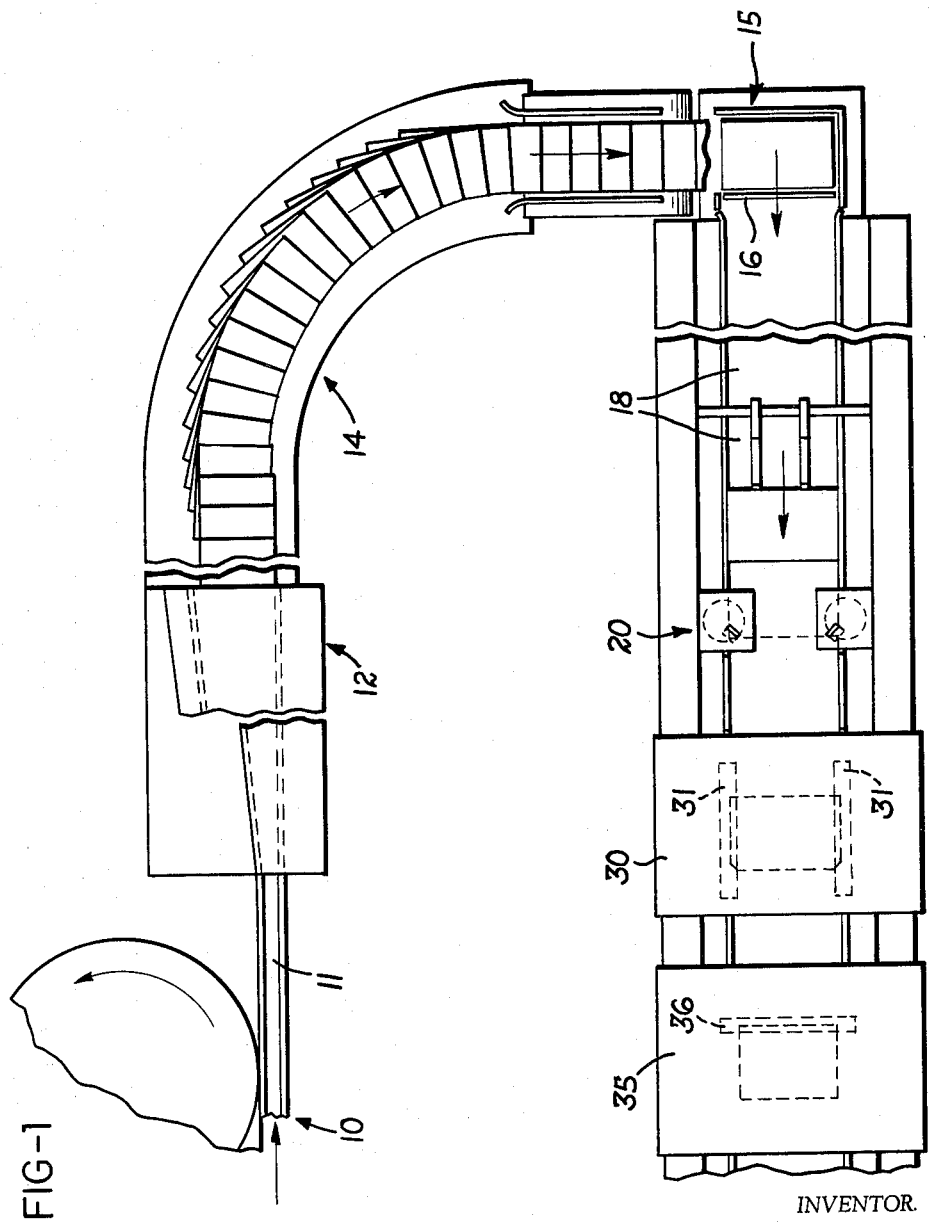

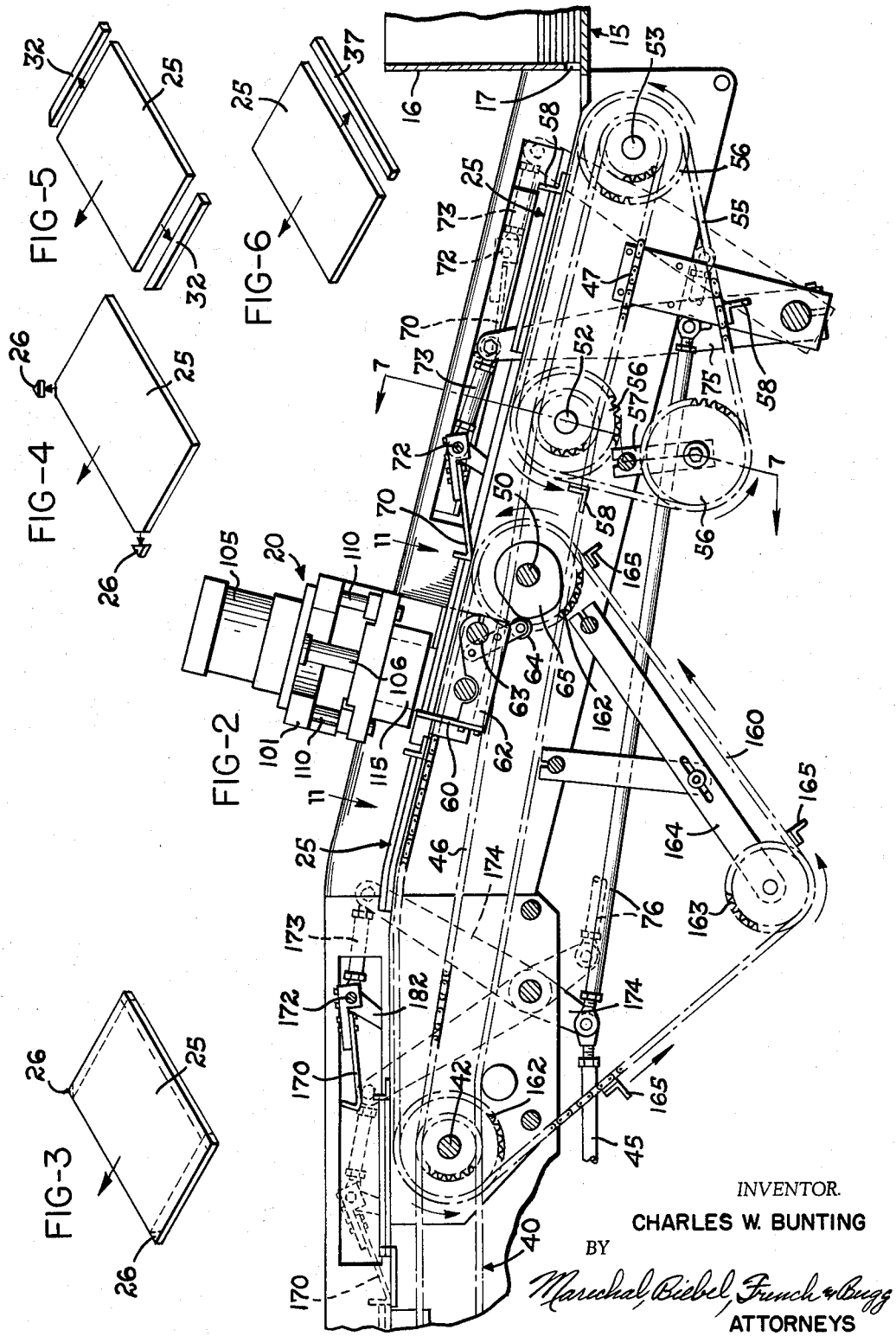

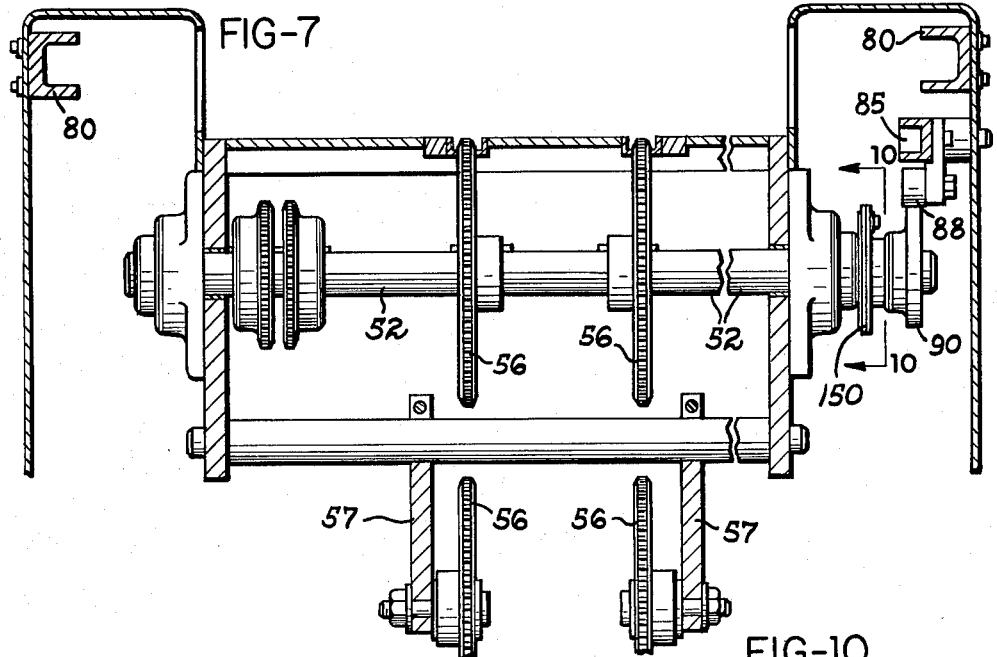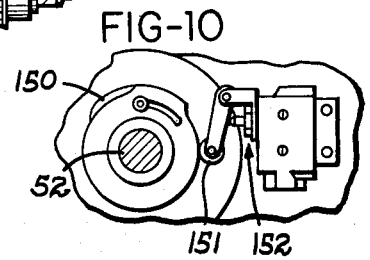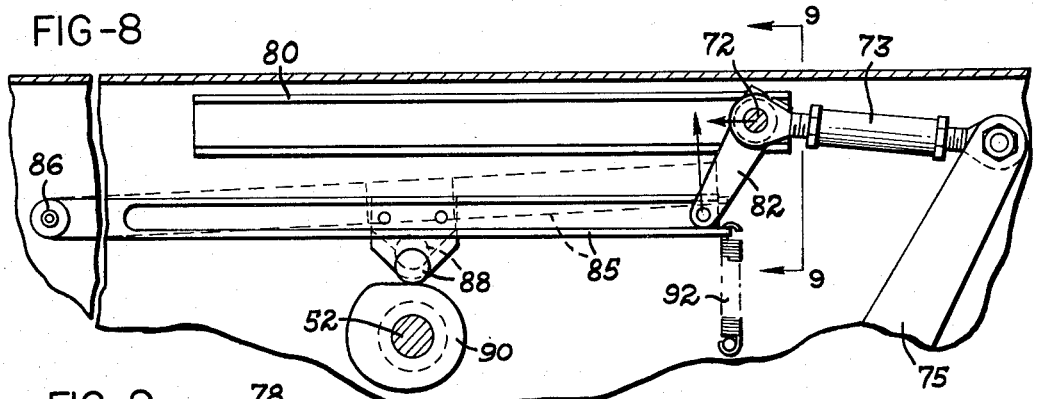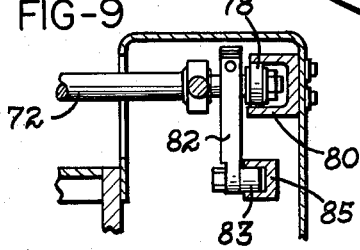

United States Patent Office 3,250,162
Patented May 10, 1966

3,250,162
METHOD AND APPARATUS FOR TRIMMING BOOKS
Charles W. Bunting, Miamisburg, Ohio, assignor to McCall Corporation, Dayton, Ohio, a corporation of Delaware
Filed Aug. 14, 1963, Ser. No. 302,030
6 Claims. (Cl. 83—23)

This invention relates to bindery equipment, and particularly to equipment for upgrading salvageable trimmings from newly bound magazines and the like.

After magazines are assembled and bound, forming the so-called backbone of the book or magazine, they are trimmed to the desired final dimensions, and the trimmings from this operation are usually collected and sold as scrap which can be repulped in the manufacture of certain papers or paperboard. In the binding of magazines in which a glued backbone is formed, the adhesive or glue used in this operation constitutes a contaminant which will be present in the trimmings in an ordinary trimming operation, since opposite ends of the backbone are trimmed when the top and bottom of the book or magazine is cut to size. This reduces the value of the trimmings, since they contain the foreign glue substance, which must be removed.

The primary object of this invention is to provide a novel apparatus and method for upgrading the trimmings in a bindery operation whereby separate trimmings are made from the glued backbone and thus the material removed in the main trimming operation is an uncontaminated scrap paper which has an increased value.

Another object of the invention is to provide a novel apparatus which can be incorporated directly between a bookbinding machine and a conventional trimming apparatus, and which operates to remove the ends of the backbone prior to the regular trimming operation, without slowing the operation of either the binding machine or the trimmer, whereby trimmings removed in the trimming machine are uncontaminated by foreign substances such as the glue employed in forming the backbone.

Another object of the invention is to provide novel apparatus which will remove the ends of the backbone of an untrimmed magazine or book and separate the resultant trimmings, whereby subsequent trimmings from the book will be free from contamination by glue or similar adhesives used in forming the backbone of the book.

Other objects and advantages of the invention will be apparent from the following description, the accompanying drawings and the appended claims.

In the drawings:

FIG. 1 is a schematic view showing the overall arrangement of a trimming operation according to the invention, and showing the general relationship of the backbone trimming apparatus with respect to a binding machine and a conventional trimmer;

FIG. 2 is a side elevational view of a backbone trimming apparatus constructed according to the invention, and showing its drive coupling to the trimmer;

FIGS. 3, 4, 5 and 6 are diagrams showing the steps in the operation of trimming a bound book or magazine according to the invention;

FIG. 7 is a sectional view on an enlarged scale, taken on line 7—7 of FIG. 2, and showing the construction of the conveyor mechanism incorporated in the backbone trimmer;

FIG. 8 is a detail view of a portion of the drive mechanism shown in FIGS. 2 and 7;

FIG. 9 is a detail sectional view taken on line 9—9 of FIG. 8;

FIG. 10 is a detail view taken on an enlarged scale on line 10—10 in FIG. 7, showing a control switch and its operating cam, used in timing the operation of the backbone trimmer;

FIG. 11 is a sectional view, showing the conveyor portions of the apparatus in plan, taken along line 11—11 of FIG. 2;

FIG. 12 is an enlarged detail view, with some parts broken away and shown in section, of one of the backbone trimmer knives and its drive;

FIG. 13 is an end view of the trimming device shown in FIG. 12, as viewed along line 13—13 with certain parts broken away and shown in section;

FIG. 14 is a sectional view on a larger scale, taken on line 14—14 of FIG. 13;

FIG. 15 is a further sectional view on an enlarged scale, taken on line 15—15 of FIG. 12;

FIG. 16 is a detail view of one of the corner trimming knives;

FIG. 17 is a detail view showing the manner in which the corner trimming knife engages books or magazines to trim the ends of the backbone thereof; and FIG. 18 is a diagram showing the arrangement of the pneumatic drive for the backbone trimmer.

Referring to the drawings, which illustrate a preferred embodiment of the invention, the discharge end of a conventional bookbinding machine is shown at 10, wherein the bound books are carried along a conveyor shown generally at 11, and wherein they are guided by the stacking device 12 such that books or magazines discharge onto the exit conveyor 14 partially overlying each other as shown, and with the glued backbone thereof facing toward the inner radius of the curvel conveyor 14. The magazines travel along this conveyor to a collector hopper 15, portions of which also are shown in FIG. 2.

The magazines are allowed to stack one on top of the other in this hopper, with the backbone against the front wall 16, until a predetermined number of them have gathered in the hopper at which time conventional discharge mechanism (not shown) pushes the magazines through the discharge opening 17 at the bottom of the front wall 16. In the arrangement shown, the magazines are thus pushed out two at a time, although they can be discharged singly or in greater numbers if desired. The bound magazines are then carried by the conveyor apparatus 18, which is explained in greater detail hereafter, to the backbone trimming or corner trimming apparatus, shown generally at 20 in FIG. 1.

At this location, as will be explained in greater detail, the corners of the backbone are cut from the magazine as shown in FIG. 4. Thus, for example, in FIG. 3 a magazine 25 is in the untrimmed condition as fed from the hopper 15. The parts to be trimmed away are shown by dotted lines and thus the corners 26 are first trimmed and the resultant trimmings removed is shown in FIG. 4. The magazine is then passed to the conventional trimmer, which includes the side trimmer section 30 having vertically movable side knives 31 which remove the top and bottom trimmings 32 as shown in FIG. 5. Next, the magazine passes to the end trimmer section 35, where the vertically movable knife 36 operates to remove the end trim section 37 as shown in FIG. 6.

Thus, according to the novel method provided by this invention, the corner trimmings 26 are removed at the backbone or corner trimming station 20 and are collected in another location from the trimmings 32 and 37 which are removed in the main trimmer. These latter trimmings therefore are uncontaminated by adhesives or the like, and can readily be processed in the manufacture of paper or paperboard, without need of removing any contaminant. This substantially upgrades the values of these trimmings for salvage purposes.

Details of the main trimmer are well known. These trimmers include a rotary drive which is connected to reciprocate the trimming knives 31 and 36 in timed relation to supply of articles to be trimmed into the trimmer. Thus, sources of continuously rotating and of reciprocating power are available from the trimmer, and in a preferred embodiment of the invention these are used to drive the backbone trimmer since this automatically insures proper timing of the backbone trimmer apparatus. It should be understood, however, that separate drive mechanism can be provided if desired. With reference to FIG. 2, the rotary drive is obtained through a chain 40 driven from the trimmer, and connected through a suitable sprocket to rotate shaft 42. The reciprocating power for pusher mechanism used in the apparatus is supplied from the rod 45 which is in turn driven in the reciprocating fashion from the trimmer.

Chains 46 and 47, and associated sprockets (not numbered), are provided to rotate shafts 50, 52 and 53 together with shaft 42. Adjacent the discharge opening 17 of the hopper, and extending upward toward the backbone trimmer apparatus 20, is a first chain conveyor provided by a plurality of chains 55 extending around sprockets 56. With respect to each chain, two of these sprockets are driven from the shafts 52 and 53, respectively, while the third sprocket is mounted on an adjustable arm 57 to provide for adjustment of the tension in the chains 55. These chains carry suitable pusher lugs 58 which serve to engage behind one (or a stack of two or more) of the magazines ejected from hopper 17, and thus this first conveyor functions to carry the magazines toward the trimming apparatus. A stack of two magazines is indicated by reference numeral 25 in FIG. 2, being pushed by the lug 58 on the upper flight of the conveyor chains 55.

Cooperating with the backbone trimming apparatus are register stops, shown as of the swinging variety, including stop bars 60 mounted on arms 62 which are in turn fastened to a pivotable supporting rod 63. Motion of the arms and stops is controlled by a roller cam follower 64 which follows a cam 65 driven from shaft 50. These stops are also shown in FIGS. 11 and 13. The stops are arranged to be in their upper or registering position as one or more magazines are thrust forward against the stops preparatory to the backbone trimming operation.

For this purpose, an accelerating pusher mechanism is provided which functions to pick up the magazines 25 from the first conveyor and carry them forward against the stops 60. This mechanism includes an L-shaped pusher 70 extending from a control shaft 72. This shaft is in turn adjusted through an adjustable link 73 to an upper drive arm 75. Portions of this mechanism are also shown in FIGS. 8 and 9. Reciprocating motion is imparted to the arm 75 by the drive rod 76 which extends forward and is connected at its other end to the drive rod 45, as shown in FIG. 2.

The opposite ends of the rod 72 are provided with rollers 78 which run in tracks 80 on opposite sides of the conveyor supporting structure. Both of these tracks are shown in FIG. 7, and one of the rollers 78 is shown in FIG. 9. The pusher 70 is caused to raise during its backward movement (toward the hopper) in order to clear the magazines being carried forward by the chain conveyor. The rearward limit of motion of the pusher and associated mechanism is shown in dotted lines in FIG. 2.

Control of this motion of the pusher is provided by an arm 82 fastened to the shaft 72 and having a follower 83 at its lower end riding in a movable guidetrack 85. This track has a pivotal mounting to the framework of the apparatus at 86, at its forward end, and a follower 88 on the movable arm is held into engagement with a control cam 90 by a spring 92 as shown in FIG. 8. The cam 90 is fastened to and driven from shaft 52. The timing of this cam is such that as the pusher withdraws toward the hopper, track 85 is raised to lift the pusher, and as the pusher is drawn forward, the track 85 drops to lower the pusher whereupon it picks up the trailing edge of the magazine and thrusts it forward to the stops 60 which are timed to be raised at this moment. The magazine is now in position with its backbone against the stops 60, indexed for the backbone trimming operation.

FIGS. 11 through 17 show details of the backbone trimmer knives and their associated mounting and drive. It should be understood that each knife has a separate support and drive, and these parts are carried on the supporting rods 63 and 63a, thus providing for adjustment of the spacing between the corner trimming knives to accommodate different sizes of magazines. The main mounting and supporting bracket is shown in FIGS. 12, 13 and 14 as a side plate 100 suitably clamped to the rods 63 and 63a, and having a support plate 101 fastened to its upper end, to which a pneumatic cylinder 105 is bolted. The piston rod 106 of this cylinder extends downward through a V-shaped opening (see FIG. 14) in the upper plate 101, and the rod is threaded or otherwise secured to a reciprocable carrier plate 108.

This carrier plate is guided for up and down movement by means of a pair of bearings 109 which fit over and slide upon guide rods 110. These rods are threaded or otherwise suitably fastened into the upper support plate 101, and depend therefrom, particularly as shown in FIGS. 2 and 12. The carrier plate 108 constitutes part of a supporting structure for a clamping and trimmer knife mounting. Bolted to the plate 108 are side plates 115 and 116. Bolted in turn to these side plates are end guide and support plates 118 and 120. These plates thus form a box-like mounting structure in which a clamp block 122 is carried. This block is provided with a pair of holes 123 which align with similar holes 124 formed in the upper plate 108. Clamp springs 125 are received in these holes and tend to move the block 122 downward beyond the lower surface of the supporting structure, as seen particularly in FIGS. 12 and 13. The clamp block 122 is thus free to move within limits with respect to its supporting structure.

At one corner of the supporting structure there is a recess or cutout 127, formed in the end plate 120, and a corner of the clamp block 122 is cut at a bias in this region, to form a space within which a trimming knife 130 is mounted. Details of one such knife are shown in FIGS. 16 and 17. The knife includes one or more threaded sockets 131 which receive mounting bolts 132 (FIG. 15) and the knife is thus mounted next to the clamp block 122 with its lowered beveled cutting edge 134 projecting alongside the clamp block. FIG. 17 shows the relative position of these parts with the clamp block 122 engaged with one or more magazines 25 and with the knife 130 just beginning to contact the corner of the backbone to remove the segments 26 (FIG. 4).

The corners of the magazines to be trimmed are supported on a plate 135 which is in turn fastened to a supporting bracket 136 extending from the main side plate 100. The plate 135 is actually supported in a slot, portions of which are shown at 137 in FIG. 11, and there are elongated holes 138 through this plate. At the rear of the plate there is a projecting adjustment stud 139 threaded into an adjusting nut 140, which is also shown in FIGS. 12 and 13. Set screws 142 extend through the elongated holes 138 and thread into the brackets 136 for clamping plate 135 in its adjusted position. This type of mounting for the plate provides for precise alignment of its raked forward edge 145 (FIG. 17) into precise alignment with the path of movement with the cutting edge 134, so that a shearing action is obtained between the edge 145 and beveled cutting edge 134.

The timing of the operation of the backbone or corner trimmer knives is controlled by the cam 150 shown in FIGS. 7 and 10. This cam is fixed to shaft 52, and may be of the type shown, made up of two discs which are fastened side by side and are adjustable to control the amount of dwell of the cam. A follower 151 is arranged to control a normally open switch 152, and this switch is in turn connected to control a solenoid 154 (FIG. 18) which will shift a control valve 155 in a pneumatic system. This valve is connected in a pneumatic circuit which normally supplies air under pressure to the "rod" side of the pneumatic cylinders 105, such that the backbone trimmer knives and the associated clamps are normally raised. Valve 155 is normally held in the position shown by a spring or the like, and when switch 152 is closed, the solenoid 154 will move the valve to shift the supply and exhaust connections to the cylinders, causing them to drive their respective rods 106 downwardly.

The clamp blocks 122 will first engage near the corners of the magazines which have been pushed against the stops 60, and as the carrier continues to descend, springs 125 will be compressed, and the knives 130 will shear the corners from the backbone of the magazines. The trim pieces 26 which are thus severed can be disposed of in any suitable way, since they will contain the glue or similar contaminant.

As the switch 152 opens, the supply of pressure air is reversed in the pneumatic cylinder, and the backbone trimmer knives will raise. The stops 60 having withdrawn, the magazines are then carried on to the trimmer by a chain conveyor made up of the chains 160 which pass around sprockets 162 and 163, the latter being an idler sprocket which is adjustably mounted on an arm 164 to maintain proper tension. The chains 160 carry pusher lugs 165, one of which will engage the magazine from which the backbone corners have just been trimmed, and carry them toward the trimmer section 30.

Near the discharge of this second chain conveyor, there is a further pusher mechanism, including the pusher 170 which is carried on a shaft 172. This shaft is driven through an adjustable link 173 from the rocker arm 174, and that arm in turn is reciprocated by the drive rod 45. Motion of the shaft 172, and hence of the pusher 170, is controlled in the same manner as the pusher 70, under the control of the same type of mechanism, including the arm 182 which corresponds to the arm 82 shown in FIGS. 2, 8 and 9. This second pusher functions to accelerate the magazines and convey them from the second chain conveyor into the side trimmer section 30, where the leading backbone edge engages suitable adjustable stops (not shown) in the trimmer, after which the trimmer knives 31 descend to remove the trimmed portions 32. As previously explained, these portions will be free from contamination by glue or the like, and as a result they can be collected and sold or otherwise used as scrap paper which is useful directly in repulping operations, without the need of treatment to remove the contamination.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. In the art of bookbinding wherein the backbone of books or magazines is formed at least in part by an adhesive, the process of upgrading the value of trimmings from the bound magazines which comprises the steps of
    (a) removing the corners of the untrimmed magazines at opposite ends of the backbone and thereby trimming the backbone to a desired predetermined length,
    (b) separately trimming the other three edges of the magazines from said backbone to the desired final dimensions of the magazines, and
    (c) collecting the trimmings from said edge trimming operation whereby any adhesive contaminant in the trimmings from the backbone is removed during the corner trimming operation and is separated from the edge trimmings.

2. In the art of bookbinding wherein the backbone of books or magazines is formed at least in part by an adhesive, the process of upgrading the value of trimmings from the bound magazines which comprises the steps of
    (a) first removing the corners of the untrimmed magazines at opposite ends of the backbone along a diagonal line intersecting the edge of said backbone at the desired final end thereof and thereby trimming the backbone to a desired predetermined length,
    (b) subsequently trimming the other three edges of the magazines from said backbone to the desired final dimensions of the magazines, and
    (c) collecting the trimmings from said final trimming operation whereby any contaminant in the trimmings due to adhesive in the backbone is removed during the first trimming operation and is separated from the final trimmings.

3. In a trimming machine for trimming the edges of bound magazines and the like to predetermined dimensions, the combination of a power operated trimming machine adapted to cut the sides of the magazines other than the backbone to predetermined dimensions, a conveyor constructed to deliver magazines to said trimming machine, retractable stops operatively associated with said conveyor and constructed and arranged to retain momentarily the magazines carried by said conveyor with the backbone thereof in an indexed position prior to feeding the magazines into said trimming machine, corner trimming knives mounted in predetermined relation to said stops, and power drive means connected to operate said corner trimming knives in timed relation to said conveyor and said stops to cut the ends of the backbone to the predetermined length of the backbone and thereby to remove the trimmings from said backbone prior to trimming of the magazines in said trimming machine.

4. In a trimming machine for trimming the edges of bound magazines and the like to predetermined dimensions, the combination of a trimming machine constructed and arranged to cut the three sides of a magazine other than the backbone to predetermined dimensions relative to said backbone, the combination of feed conveyor means operating in timed relation with said trimming machine to advance untrimmed magazines into said trimming machine with the backbones of the magazines in a predetermined position, retractable stops cooperating with said conveyor to position magazines carried thereby with the backbone of the magazines in an indexed position prior to feeding the magazines into said trimming machine, a pair of corner trimming knives having blades extending in planes which intercept said backbone at the ends of the ultimate desired length of the book, power operated drives connected to said corner trimming knives for reciprocating the knives to sever the corners of the backbone of the untrimmed magazines from the remainder thereof whereby corner trimming is accomplished prior to the main trimming operation in said trimming machine, and controls for said power operated drives functioning in timed relation to said conveyor to cause a cutting operation of said knives whenever a magazine is engaged with said stops.

5. Apparatus as defined in claim 4, including clamping means cooperating with said corner trimming knives and operated by said power drives to hold the magazines in a stationary position during a cutting operation of said knives.

6. Apparatus as defined in claim 4, including independent adjustable mountings for said corner trimming knives providing for changing the spacing therebetween according to the desired final length of the backbone.

References Cited by the Examiner

UNITED STATES PATENTS

| | | | |
|---|---|---|---|
| 736,166 | 8/1903 | Stimpson | 83—926 X |
| 1,124,619 | 1/1915 | Inman et al. | 83—255 |
| 1,916,380 | 7/1933 | Leland | 83—255 |
| 1,962,024 | 6/1934 | Mann | 83—39 |
| 2,188,916 | 2/1940 | Murch | 83—39 |
| 3,125,920 | 3/1964 | Smith | 83—917 X |
| 3,146,650 | 9/1964 | Sarring et al. | 83—255 X |

ANDREW R. JUHASZ, *Primary Examiner.*

J. B. McGUIRE, *Assistant Examiner.*